(12) United States Patent
Takahashi et al.

(10) Patent No.: US 7,165,448 B2
(45) Date of Patent: Jan. 23, 2007

(54) METHOD OF CHECKING SPROCKET ATTACHMENT AND SENSOR JIG USED FOR SAME

(75) Inventors: Yuji Takahashi, Fuji (JP); Kenichi Makita, Fuji (JP); Manabu Sato, Fuji (JP)

(73) Assignee: JATCO Ltd (JP)

( * ) Notice: Subject to any disclaimer, the term of this patent is extended or adjusted under 35 U.S.C. 154(b) by 0 days.

(21) Appl. No.: 11/219,237

(22) Filed: Sep. 2, 2005

(65) Prior Publication Data

US 2006/0059981 A1 Mar. 23, 2006

(30) Foreign Application Priority Data

Sep. 2, 2004 (JP) .............................. 2004-256005

(51) Int. Cl.
*G01M 19/00* (2006.01)
(52) U.S. Cl. ..................................... 73/118.1
(58) Field of Classification Search .................. 73/116, 73/117.2, 117.3, 118.1, 119 R, 1.79
See application file for complete search history.

(56) References Cited

U.S. PATENT DOCUMENTS

| 4,353,445 A | * | 10/1982 | Moss | 192/224 |
| 5,934,234 A | * | 8/1999 | Shichinohe et al. | 123/90.31 |
| 2005/0085329 A1 | * | 4/2005 | Kawakubo et al. | 475/219 |

* cited by examiner

*Primary Examiner*—Eric S. McCall
(74) *Attorney, Agent, or Firm*—Rossi, Kimms & McDowell, LLP

(57) ABSTRACT

After a driven sprocket into which a ball bearing is press-fitted is pushed into a cylindrical portion of a pump cover, a sensor jig is set so as to have its legs extending from a base plate in contact with an end face of the cylindrical portion, and a front end of a sensor plate movable in parallel with the leg 13 in contact with an end face of the ball bearing. When the driven sprocket is not in a normal position in relation to the oil pump, the sensor plate intersects a light path between a light-emitting device and a light-receiving device placed as opposed to each other on the base plate, and on the other hand, when the driven sprocket is in a normal position, a light-passing hole formed in the sensor plate comes on the light path between the light-emitting device and the light-receiving device. Thereby it can be automatically determined based upon absence or presence of an optical signal from the light-receiving device whether or not an attachment state is appropriate.

5 Claims, 5 Drawing Sheets

METHOD OF CHECKING SPROCKET ATTACHMENT AND SENSOR JIG USED FOR SAME

BACKGROUND OF THE INVENTION

1. Field of the Invention

The present invention relates to a method of checking sprocket attachment in attaching a driven sprocket for an oil pump drive to an oil pump, for example, in a transmission and a sensor jig used for the same.

2. Description of the Prior Art

In a recent transmission for a vehicle an oil pump is located in a position at a distance from a main shaft of the transmission, and a chain is wound between a drive sprocket provided on the main shaft side and a driven sprocket mounted to the oil pump to transmit rotation from the main shaft to the oil pump, thereby driving the oil pump.

The oil pump has its rotation shaft connected to the driven sprocket, as well as supports the driven sprocket through a bearing.

Namely a pump cover 31 forming a body of an oil pump 30, as shown in FIG. 4, surrounds a rotation shaft 32 leaving a space of a predetermined distance and is provided with a cylindrical portion 34 extending along the rotation shaft 32. A driven sprocket 40 is provided in the central part with a boss portion 44 extending toward the oil pump 30, and a spline hole 45 passing through the boss portion 44.

The rotation shaft 32 also has a spline formed in a front end thereof. The boss portion 44 of the driven sprocket 40 is in spline engagement with the rotation shaft 32.

A ball bearing 50 is press-fitted onto an outer periphery of the boss portion 44. The ball bearing 50 is inserted into a bearing receiving portion 36 of the cylindrical portion 34 simultaneously when the boss portion 44 is inserted onto an outer periphery of the rotation shaft 32.

FIG. 5 is an enlarged view showing the cylindrical portion 34 viewed in the axial direction. A ring groove 37 is formed in the bearing receiving portion 36 of the cylindrical portion 34. A snap ring 39 is fitted in the ring groove 37 in advance before the ball bearing 50 is inserted into a bearing receiving portion 36. Namely, a notch portion 35 is formed in a part of the circumferential direction of the cylindrical portion 34. The snap ring 39 is fitted into the ring groove 37, by holding grips at both ends of the snap ring 39 within the notch portion 35 so as to make the grips closer with each other, and thereby reducing a diameter of the snap ring 39.

The snap ring 39 fitted in the ring groove 37, as shown in FIG. 5, is arranged in such a way that a part in the inner side of the snap ring 39 in its free state is exposed from a wall surface of the bearing receiving portion 36.

In assembling, before inserting the driven sprocket 40 into the bearing receiving portion 36, the grips of the snap ring 39 are made apart away from each other, so that the snap ring 39 is concealed inside the ring groove 37 once. The driven sprocket 40 is inserted into the bearing receiving portion 36 with the snap ring 39 concealed inside the ring groove 37 and is pushed in to a predetermined attachment position. Thereby, a ring groove 52 formed on an outer periphery of an outer lace 51 of the ball bearing 50 is in alignment with the ring groove 37 of the bearing receiving portion 36 and then, the snap ring 39 is restored back to a free state and is fitted partially into the ring groove 52 of the outer periphery of the outer lace 51, so that the snap ring 39 lies across both of the ring grooves 37 and 52.

In a case where a chamfering portion 54 is provided in an outer periphery corner of the outer lace 51 of the ball bearing 50, even if the grips of the snap ring 39 are not kept away from each other by hand, the snap ring 39 are pressed and expanded by the chamfering portion 54 when the ball bearing 50 enters into the bearing receiving portion 36 of the cylindrical portion 34. With the construction stated above the ball bearing 50 is prevented from being coming out of the cylindrical portion 34, thus the driven sprocket 40 is attached to the oil pump 30 without falling out of the rotation shaft 32.

A similar attachment construction is disclosed in Japanese Patent Laid-open Publication No. 2003-301929.

Conventionally, after the boss portion 44 of the driven sprocket 40 is inserted and pushed onto the rotation shaft 32, a worker has to lift the driven sprocket 40 by hand and check whether or not the snap ring 39 is engaged to the ring groove 52 of the ball bearing 50 and therefore the driven sprocket 40 does not come out of the cylindrical portion 34, to make sure that the driven sprocket 40 was attached in a normal position in relation to the oil pump 30.

According to this method, however, despite of no engagement of the snap ring 39 to the ring groove 52 of the ball bearing 50, there is a case where snap ring 39 looks as if it is engaged to the groove 52, due to resistance such as friction between the bearing receiving portion 36 of the cylindrical portion 34 and the ball bearing 50. This makes it difficult to have an accurate determination.

This problem is not limited to the case of attaching a driven sprocket to an oil pump, but occurs generally in sprocket attachment.

SUMMARY OF THE INVENTION

Accordingly, in view of the foregoing problems, it is an object of the present invention to provide a method of checking sprocket attachment and a sensor jig used for the method, with which it can be properly determined whether or not a sprocket is attached in a normal position.

To accomplish the above object, there is provided a method of checking sprocket attachment in which a sensor jig equipped with a base and a sensor plate movable relative to the base is used. The method comprises; bringing the base of the sensor jig in contact with a reference face of an object device and the sensor plate of the sensor jig in contact with a reference face of a sprocket side, in an axial direction respectively; and determining whether or not the sprocket is attached in a normal position in relation to the object device, based upon a relative position between the base and the sensor plate.

According to the present invention, instead of observing that the sprocket does not come out if the sprocket is lifted by hand, a worker determines whether or not the sprocket is attached in a normal position based upon a relative position between the base related to a reference face of the object device to which the sprocket is attached and a sensor plate related to a reference face of the sprocket side.

As a result, the worker can certainly confirm that the sprocket is attached in a normal position without possibility of an erroneous judgment.

These and other objects, features, aspects and advantages of the present invention will be become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will be explained with reference to the drawings.

Figure 1:
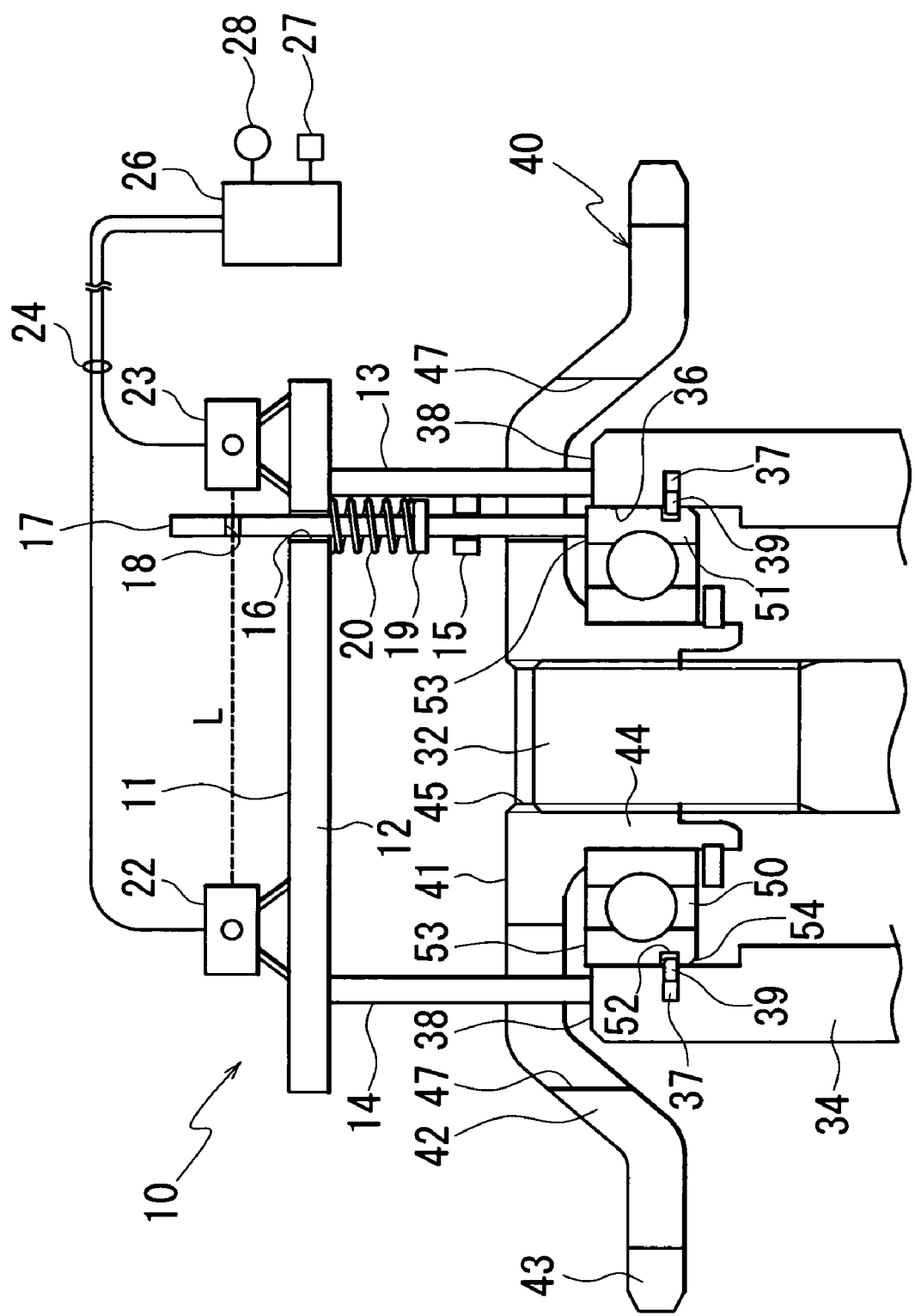
FIG. 1 is a cross-sectional view showing a driven sprocket attachment structure of an oil pump and a sensor jig used therein in a preferred embodiment of the present invention.
Figure 2:
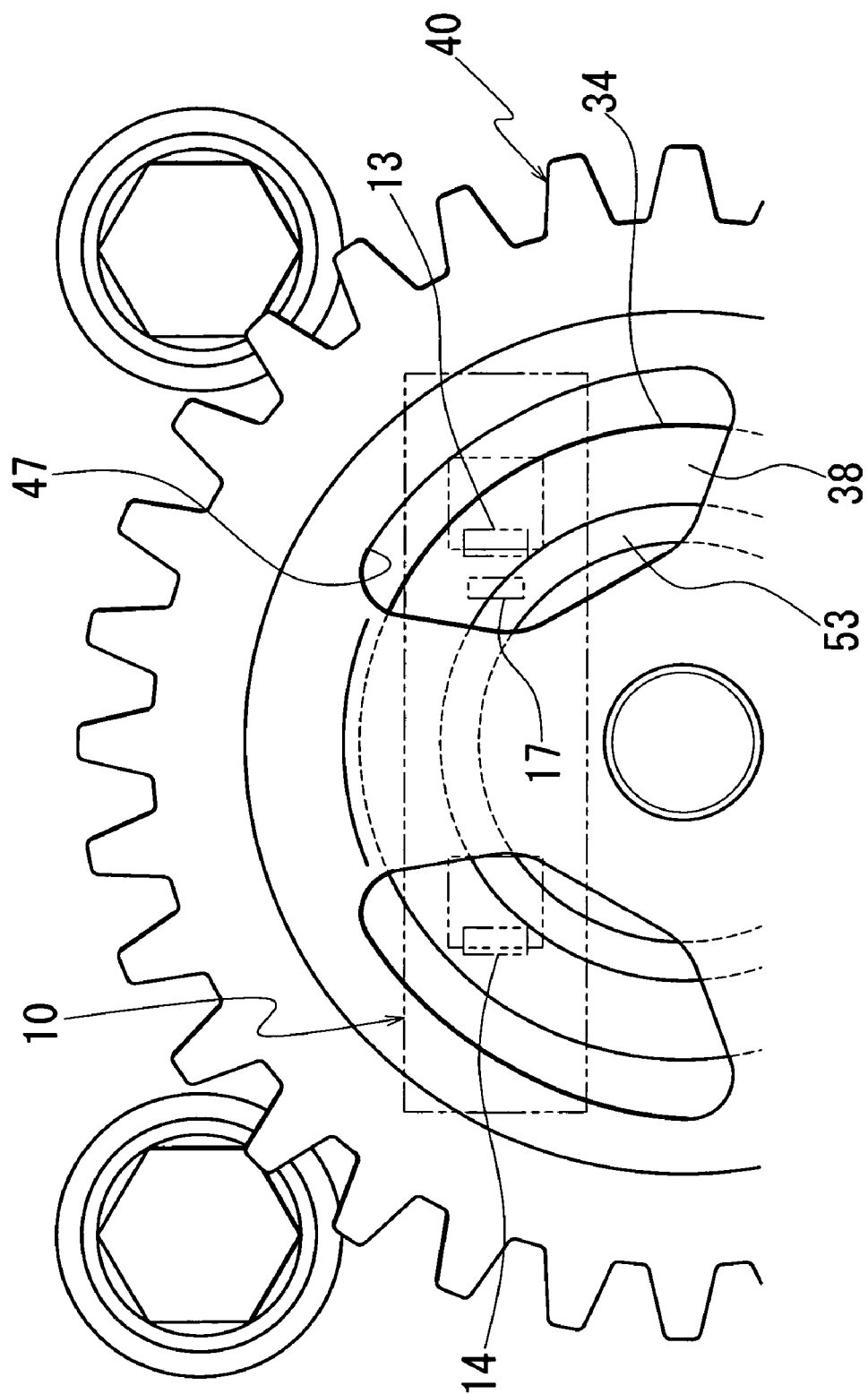
FIG. 2 is a top view showing the driven sprocket attachment structure of the oil pump and the sensor jig used therein in the preferred embodiment of the present invention.

FIG. 1 is a cross-sectional view showing a preferred embodiment which is applied to a driven sprocket attachment to an oil pump as the object device. FIG. 2 is a top view seen in the axial direction. Note that FIG. 2 shows a sensor jig to be described later in a phantom line.

Figure 4:
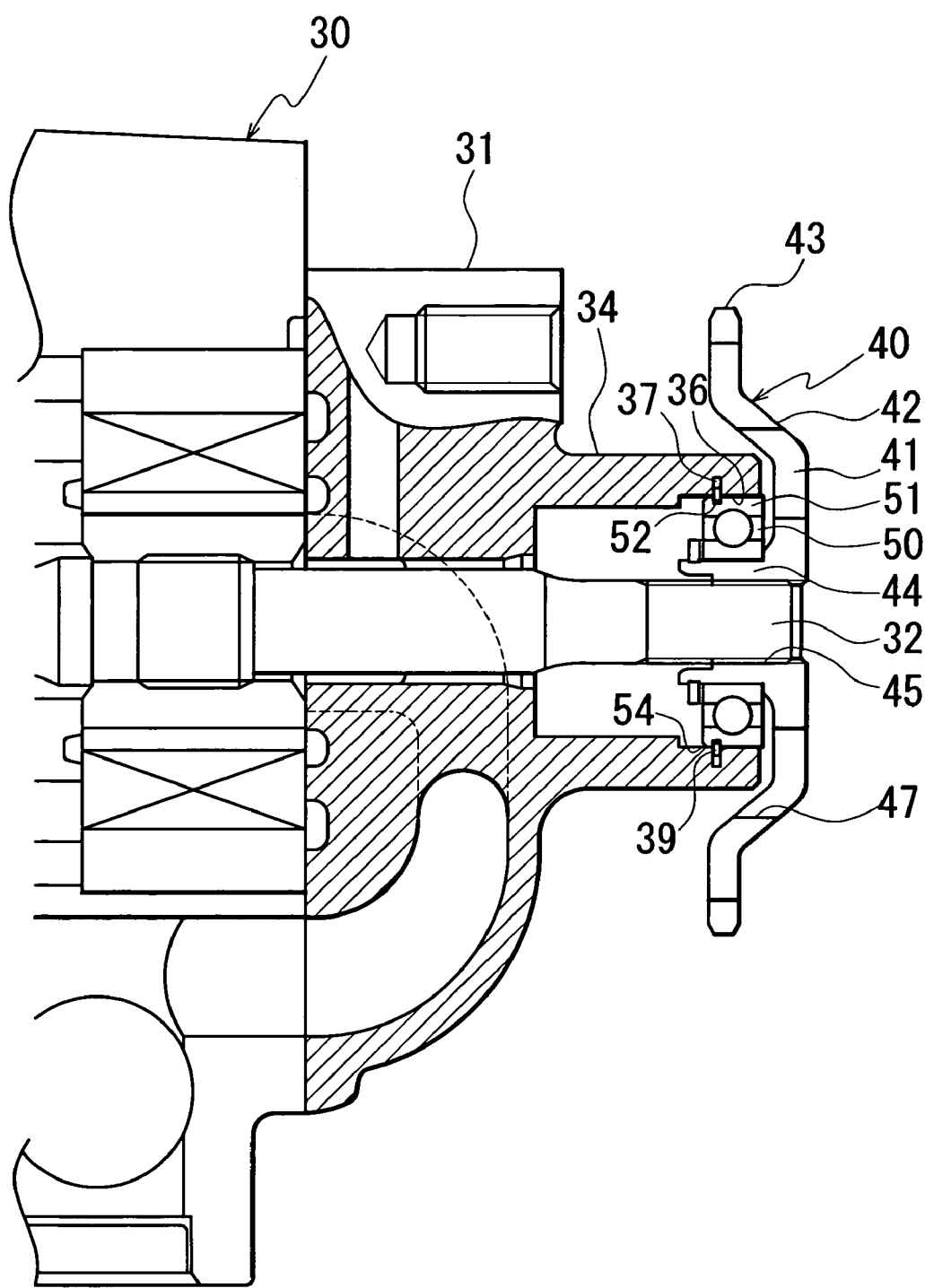
FIG. 4 is a cross-sectional view showing the driven sprocket attachment structure of the oil pump.
Figure 5:
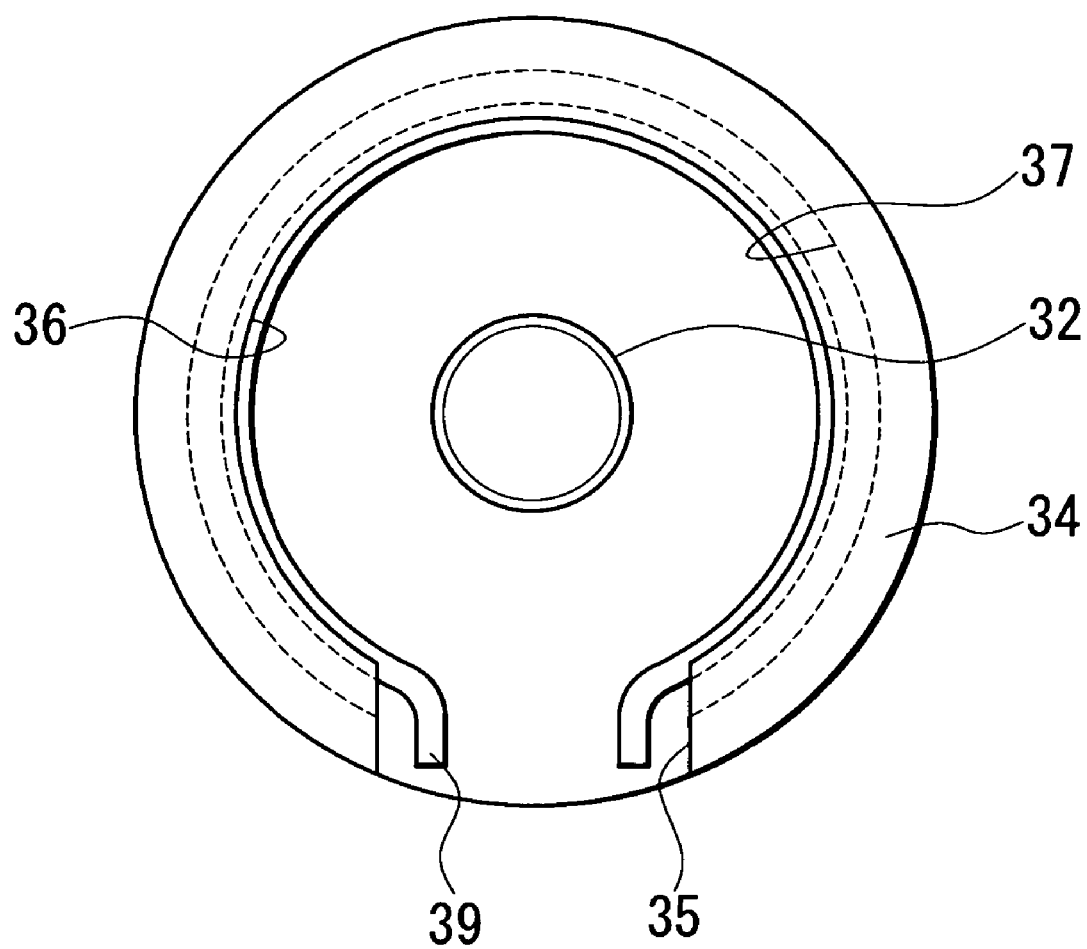
FIG. 5 is a view showing an attachment portion of the driven sprocket seen in an axial direction.

An attachment structure of a driven sprocket is the same as in FIGS. 4 and 5. In more detail, the driven sprocket 40 is composed of a disc portion 41 provided with a boss portion 44 in the center and a teeth portion 43 disposed in a peripheral edge of the disc portion 41. The disc portion 41 has a diameter which corresponds to an outer diameter of the cylindrical portion 34 of the pump cover 31.

The teeth portion 43 is offset from the disc portion 41 via a slant portion 42 to a side of the pump cover 31 via a slant portion 42, and is nearly in alignment with a ball bearing 50 in an axial direction. Accordingly when a chain is wound around the teeth portion 43, a load in a direction perpendicular to a shaft is exerted on the ball bearing 50.

Three working holes 47 are formed from the disc portion 41 over the slant portion 42 of the driven sprocket 40, at equal intervals in the circumferential direction, so that an end face 38 of the cylindrical portion 34 and at least an end face 53 of the outer lace 51 can seen through the working holes 47 from outside.

Checking of the sprocket attachment in the above attachment structure is carried out by using a sensor jig 10.

The sensor jig 10 comprises a base 11 including a rectangular, flat base plate 12 and two legs extending in parallel with each other vertically from a back face of the base plate 12. On both ends of the base 11 a light-emitting device 22 outputting a laser beam and a light-receiving device 23 receiving the laser beam are disposed as opposed to each other.

Lengths of the two legs 13 and 14 and a distance therebetween are set so that the two legs 13 and 14 pass through two different working holes 47 and are respectively brought in contact with the end face 38 of the cylindrical portion 34 in the pump cover 31 as a reference face of an oil pump side.

The base plate 12 is provided with a plate hole 16 for allowing a sensor plate 17 to pass therethrough, the plate hole 16 being positioned very close to the leg 13 which is located at a side where the light-receiving device 23 is disposed, as well as inside the leg 13, namely at a side closer to the other leg 14. The leg 13 is provided with a guide 15 for guiding the sensor plate 17 inserted into the plate hole 16.

Figure 3:
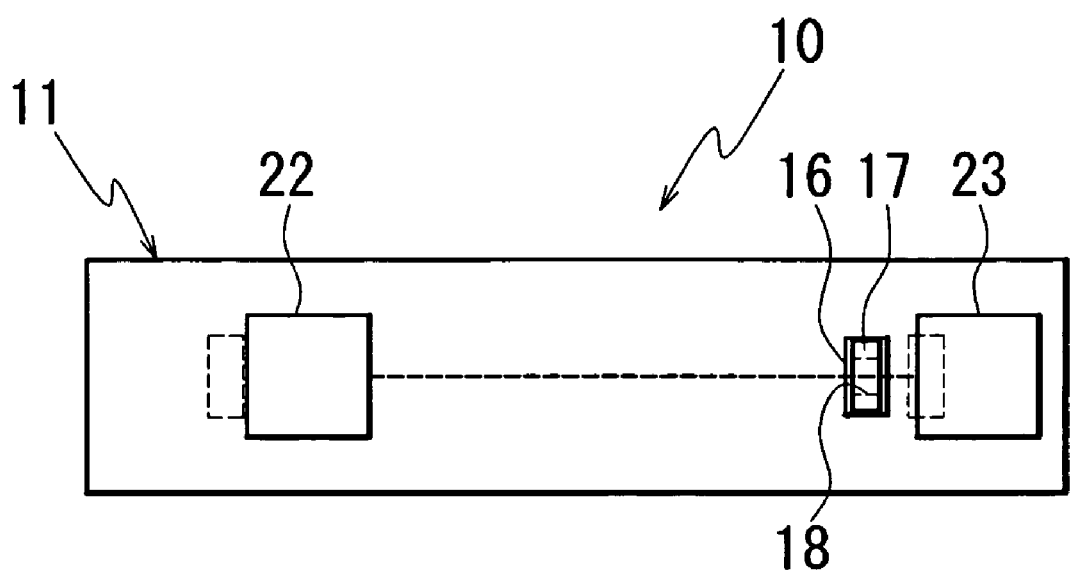
FIG. 3 is a top view showing the sensor jig.

The sensor plate 17 passes through the plate hole 16 and the guide 15 to extend in parallel with the leg 13, and a lower end of the sensor plate 17 is adapted to be brought in contact with an end face 53 of the outer lace 51 as a reference face of a side of the driven sprocket 40. The sensor plate 17, as shown in FIG. 3, intersects a light path L between the light-emitting device 22 and the light-receiving device 23 over an upper face of the base plate 12.

A light-passing hole 18 is provided at an upper portion of the sensor plate 17. The light-passing hole 18 is adapted to be positioned in such a way that when the lower end of the sensor plate 17 is brought in contact with the end face 53 of the outer lace 51 in a state where the driven sprocket 40 is attached in a normal position in relation to the oil pump 30, light emitted from the light-emitting device 22 is received at the light-receiving device 23 through the light-passing hole 18.

According to the preferred embodiment, in the back side of the base plate 12 of base 11, a spring 20 is provided between a stopper 19 disposed on the sensor plate 17 and the base plate 12 to urge the sensor plate 17 downwards, thus pushing the stopper 19 to the guide 15 in a free state of the sensor plate 17. In this state the light-passing hole 18 of the sensor plate 17 deviates downwards from the light path L between the light-emitting device 22 and the light-receiving device 23, therefore blocking the light.

The urging of the spring 20 causes lower end of the sensor plate 17 to be brought in contact with the end face 53 of the outer face 51 before the two legs 13 and 14 are brought in contact with the end face 38 of the cylindrical portion 34.

The light-emitting device 22 and the light-receiving device 23 are respectively connected via wiring 24 to a control monitor 26, which is provided with a switch 27 and a display lamp 28. Turning on the switch 27 causes the light-emitting device 22 to output laser light, providing an input-receiving state of the control monitor 26 for receiving an optical signal from the light-receiving device 23. And when the optical signal is inputted to the control monitor 26, the display lamp 28 switches on.

With respect to the checking process of the sprocket attachment, first the boss portion 44 of the disc portion 41 is inserted on the rotation shaft 32 and the driven sprocket 40 is pushed into the oil pump 30 by a predetermined amount. Thereafter, the sensor jig 10 is set by contacting the two legs 13 and 14 to the end face 38 of the cylindrical portion 34 in the pump cover 31.

In this process, first the sensor plate 17 is brought in contact with the end face 53 of the outer lace 51 and thereafter, as the two legs 13 and 14 approach the end face 38 of the cylindrical portion 34, the sensor plate 17 goes up relative to the base plate 12 against a pressing force of the spring 20.

The switch 27 of the control monitor 26 is turned on before or after setting the sensor jig 10.

When the two legs 13 and 14 are brought in contact with the end face 38 of the cylindrical portion 34, if the driven sprocket 40 is in a normal position, that is, a position where the ring groove 52 of the outer lace 51 is in alignment with the ring groove 37 of the bearing-receiving portion 36 to fit the snap ring 39 into the ring groove 52, the light-passing hole 18 of the sensor plate 17 comes on the light path L between the light-emitting device 22 and the light-receiving device 23, so that the light-receiving device 23 receives laser light from the light-emitting device 22.

As a result, by observing that the display lamp 28 switches on, it can be confirmed that the driven sprocket 40 is in a normal position and thus the snap ring 39 is fitted into the ring groove 52 of the outer lace 51.

The preferred embodiment is constructed as above, and the base 11 of the sensor jig 10 is brought in contact with the end face of the oil pump 30, as well as the sensor plate 17 is brought in contact with the end face 53 of the ball bearing 50 in the side of the driven sprocket 40, in the axial direction respectively, thus determining whether or not the driven sprocket 40 is attached in a normal position in relation to the oil pump 30 based upon a relative position between the base 11 and the sensor plate 17. As a result, in contrast with a case where a worker lifts up the driven sprocket 40 by hand to observe that the driven sprocket 40 does not slip off from the cylindrical portion 34, the worker can certainly confirm that the driven sprocket 40 is attached in a normal position, with no possibility of occurrence of an erroneous judgment.

And in an attachment structure where the driven sprocket 40 is provided with the boss portion 44 into which the rotation shaft 32 is inserted and the ball bearing 50 is fixed on an outer periphery of the boss portion 44 and the oil pump 30 is provided with the cylindrical portion 34 holding the ball bearing 50, the two legs 13 and 14 of the base 11 are arranged to be brought in contact with the end face 38 of the cylindrical portion 34 through the working holes 47 formed in the driven sprocket 40 and the sensor plate 17 is arranged to be brought in contact with the end face 53 of the ball bearing 50 through the working hole 47. Therefore, a position relation between components related directly to normality of an attachment position can be confirmed.

Particularly the sensor jig 10 has the base 11 including the base plate 12 and the legs 13 and 14 extending from the base plate 12, the sensor plate 17 is movable in parallel to the leg 13 and positioned to intersect a light path between the light-emitting device 22 and light-receiving device 23 which are located as opposed to each other on the base plate 12, and also the sensor plate 17 is provided with the light-passing hole 18, and in a condition that the relative position of the sensor plate 17 to the base plate 12 corresponds to a state where the driven sprocket 40 is attached in a normal position in relation to the oil pump 30, the light-receiving device 23 outputs the optical signal as a confirmation signal when the legs 13 and 14 are brought in contact with the end face 38 of the cylindrical portion 34 as a reference face in a side of the oil pump 30, and the sensor plate 17 is brought in contact with the end face 53 of the ball bearing 50 as a reference face in a side of the driven sprocket 40.

Accordingly, only by bringing the legs 13 and 14 in contact with the end face 38 of the cylindrical portion 34 and the sensor plate 17 in contact with the end face 53 of the ball bearing 50, it is automatically judged based upon presence or absence of the optical signal whether or not a sprocket attachment state is correct.

It is noted that in the preferred embodiment, it is explained that after the driven sprocket 40 is attached to the oil pump 30, a worker sets the sensor jig 10 for attachment check, but a checking operation may be automatically performed using a robot (not shown).

In this case, the driven sprocket 40 is pressed and pushed into the oil pump 30 by a predetermined amount, and thereafter, first the driven sprocket 40 is rotated to set the working hole 47 to be in a predetermined angular position.

Next, the robot moves the sensor jig 10 in the axial direction of the oil pump 30 forward to bring the two legs 13 and 14 of the sensor jig 10 in contact with the end face 38 of the cylindrical portion 34 in the pump cover 31.

As described above, the sensor plate 17 contacts the end face 53 of the outer lace 51 by a point where the two legs 13 and 14 are brought in contact with the end face 38 of the cylindrical portion 34, and thus the sensor plate 17 displaces relative to the base plate 12.

When the light-passing hole 18 of the sensor plate 17 moves to a position which corresponds to a light path between the light-emitting device 22 and the light-receiving device 23, the optical signal from the light-receiving device 23 is outputted to the control monitor 26 to turn on the display lamp 28. Unless the optical signal is outputted to the control monitor 26 within a predetermined time after the two legs 13 and 14 of the sensor jig 10 are brought in contact with the end face 38 of the cylindrical portion 34 in the pump cover 31, a warning may be produced from the control monitor 26.

And after the display lamp 28 switches on or the warning is outputted, the robot retreats the sensor jig 10.

It is noted that in the preferred embodiment the sensor plate 17 of the sensor jig 10 is held on the base 11 in a state where the sensor plate 17 is urged by the spring 20, but the feature of the sensor plate is not limited to this. For example, after the two legs 13 and 14 are brought in contact with the end face 38 of the cylindrical portion 34, the sensor plate 17 may be inserted through the plate hole 16 of the base plate 12 to bring the front end (lower end) thereof in contact with the end face 53 of the outer lace 51 of the ball bearing 50. And in the case of using the robot, the sensor plate 17 is made to advance and retreat independently from the base 11.

In the preferred embodiment, an example where a driven sprocket is attached to an oil pump is explained, but the present invention can be applied to the attachment of various sprockets.

In the preferred embodiment, the end face 38 of the cylindrical portion 34 is used as a reference face of an object device to which the sprocket is attached, with which the legs 13 and 14 of the sensor jig 10 are brought in contact, and the end face 53 of the ball bearing 50 press-fitted onto the driven sprocket 40 is used as a reference face of a sprocket side, with which the sensor plate 17 is brought in contact, but these reference faces may be appropriately selected in accordance with a sprocket attachment structure.

What is claimed is:

1. Method of checking sprocket attachment in an attachment structure in which a sprocket is pushed into a rotating shaft of an object device, comprising the steps of:
   preparing a sensor jig equipped with a base and a sensor plate movable relative to the base;
   bringing the base of said sensor jig in contact with a reference face of the object device and the sensor plate of said sensor jig in contact with a reference face of a sprocket side, in an axial direction respectively; and
   determining whether or not the sprocket is attached in a normal position in relation to the object device, based upon a relative position between said base and said sensor plate.

2. Method of checking sprocket attachment according to claim 1, wherein:
   said reference face of the object device is an end face facing the sprocket; and
   said base is brought in contact with said end face through a working hole formed in the sprocket.

3. Sensor jig used for checking sprocket attachment in an attachment structure in which a sprocket is pushed into a rotating shaft of an object device, comprising:
   a base provided with a base plate and legs extending from said base plate;
   a sensor plate movable in parallel to said legs; and a signal output device to output a confirmation signal when a relative position of said sensor plate to said base plate is a predetermined value, wherein:

in a condition that the sprocket is attached in a normal position in relation to the object device, said signal output device outputs said confirmation signal when said legs are brought in contact with a reference face of the object device and said sensor plate is brought in contact with a reference face of the sprocket side.

4. Sensor jig according to claim 3, wherein:

the sprocket is provided with a boss portion into which the rotating shaft is inserted, a bearing is fixed on an outer periphery of said boss portion, and the object device is provided with a cylindrical portion holding said bearing, and wherein:

said legs of said base are arranged to be brought in contact with an end face of said cylindrical portion through a working hole formed in the sprocket; and said sensor plate is arranged to be brought in contact with an end face of said bearing through said working hole.

5. Sensor jig according to claim 3 or 4, wherein:

said signal output device is arranged in such a way that said sensor plate is positioned to intersect a light path between a light-emitting device and a light-receiving device placed as opposed to each other on said base plate, and a light-passing hole is formed in said sensor plate, so that when a relative position of said sensor plate to said base plate is said predetermined value, light from said light-emitting device is received through said light-passing hole at said light-receiving device, which outputs said confirmation signal upon receiving the light.

* * * * *